US005893091A

United States Patent [19]
Hunt et al.

[11] Patent Number: 5,893,091
[45] Date of Patent: Apr. 6, 1999

[54] MULTICASTING WITH KEY WORDS

[75] Inventors: Douglas Hunt, Seattle; Mauro Calvi, Bellevue; Carlen Brett Bennett, Seattle; Robert L. Hines, Jr., Seattle; James Peterson, Seattle, all of Wash.

[73] Assignee: Immediata Corporation, Seattle, Wash.

[21] Appl. No.: 827,829

[22] Filed: Apr. 11, 1997

[51] Int. Cl.⁶ ........................................... G06F 17/30
[52] U.S. Cl. ........................... 707/3; 707/4; 707/10; 707/104; 395/200.36; 395/200.48
[58] Field of Search .................... 707/3, 4, 5, 6, 707/10, 104; 395/200.36, 200.48

[56] References Cited

U.S. PATENT DOCUMENTS

| | | | |
|---|---|---|---|
| 5,557,798 | 9/1996 | Bowless | 395/650 |
| 5,634,048 | 5/1997 | Ryu et al. | 395/610 |
| 5,694,594 | 12/1997 | Chang | 395/606 |
| 5,727,129 | 3/1998 | Barrett et al. | 395/12 |
| 5,754,938 | 5/1998 | Herz et al. | 455/4.2 |
| 5,754,939 | 5/1998 | Herz et al. | 455/4.2 |
| 5,761,662 | 6/1998 | Dasan | 707/10 |
| 5,796,952 | 8/1998 | Davis et al. | 395/200.54 |

OTHER PUBLICATIONS

TIBnet; date of Pub. Apr. 22, 1997; Publisher: TIBCO on the Internet.

Rus et al. "Customizing Information Capture and Access" ACM Transactions on Information Systems, vol. 15, No. 1, pp. 67–101, Jan. 1997.

Mostafa et al. "A Multi–Level Approach to Intelligent Information Filtering: Model, System and Evaluation" ACM Transactions on Information Systems, vol. 15, No. 4, pp. 368–399, Oct. 1997.

*Primary Examiner*—Thomas G. Black
*Assistant Examiner*—Michael J. Wallace, Jr.
*Attorney, Agent, or Firm*—Graybeal Jackson Haley, LLP

[57] ABSTRACT

A method for distributing timely information over a computer network where a Timely Information Server collects and organizes information from Timely Information Providers and then broadcasts the organized information to endusers in the form of an alerts over a plurality of alert channels. The alert is comprised of keywords and arguments, wherein the keywords describe the subject matter of the alert and the arguments provide content of the alert. The Timely Information Server maintains a dictionary of all possible keywords and the endusers copy a portion of the dictionary to their local computers to create individual keyword profiles which are comprised of keywords and Boolean operators. When an alert satisfies a Boolean equation in a users keyword profile the headline of the alert (stored as an argument) is displayed and the user is given the option to link his/her web browser to an associated URL (also stored as an argument).

70 Claims, 9 Drawing Sheets

FIG. 5
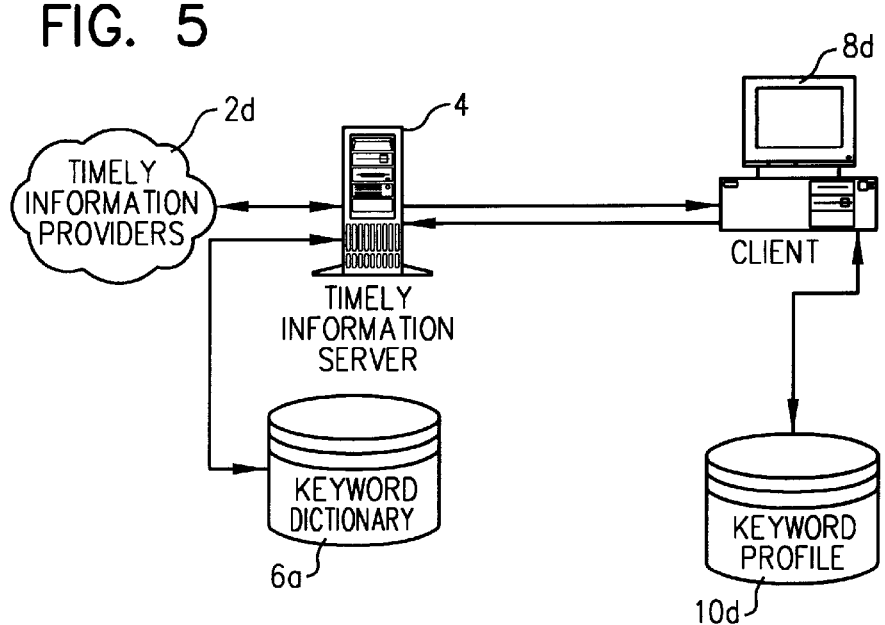
FIG. 8
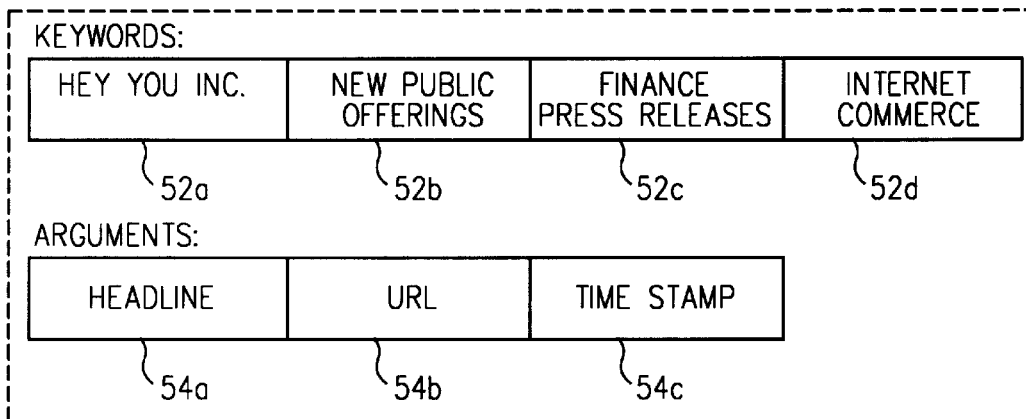
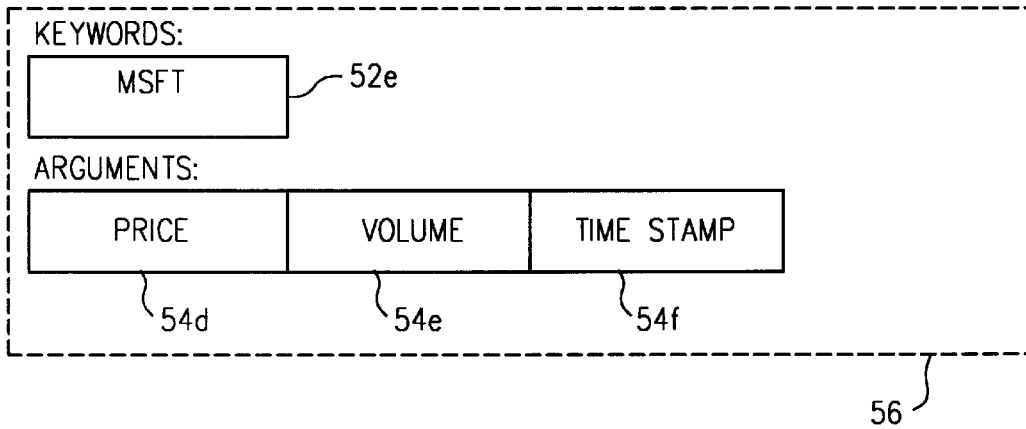

MULTICASTING WITH KEY WORDS

FIELD OF THE INVENTION

The present invention relates generally to a system for managing and distributing information, and more particularly to a system for managing and distributing information via the global computer network and providing a unified system for organizing information.

BACKGROUND OF THE INVENTION

The Global Computer Network, more commonly referred to as the Internet, is comprised of many individual networks, such as NSFNet and the Defense Data Network, along with gateways to others, such as Bitnet. The Internet is a Transmission Control Protocol/Internet Protocol (TCP/IP) based network linking millions of computers around the world. The use of TCP/IP allows a wide variety of computers to communicate with one another including Unix workstations, personal computers running MS DOS, Windows, Linux, OS2, MacOS, BeOS, IBM mainframes, DEC minicomputers, and even Cray supercomputers.

The Word Wide Web (WWW) is a network of servers on the Internet, each of which has one or more home pages, and which provides information and hypertext links to other documents on that and other servers. The Word Wide Web was developed in 1989 by Tim Berners-Lee at the European Laboratory for Particle Physics (CERN). World Wide Web servers communicate with clients by using the Hypertext Transfer Protocol (HTTP). The resources on the Worldwide Web are provided with Uniform Resource Locators (URLs) which provide an address for the servers that are part of the World Wide Web portion of the Internet. The documents which make up the substance of the World Wide Web are typically viewed using specialized software packages referred to as browsers. When a browser is directed to a URL and the hypertext document associated with URL is displayed by the browser or an associated helper application.

Uniform Resource Locators are a naming scheme for specifying how and where to find any Internet server resource, such as Gopher, FTP, WAIS or Web servers. World Wide Web hypertext documents use URLs to reference other hypertext resources.

The hypertext transfer protocol (HTTP) is an Internet protocol designed expressly for the rapid distribution of hypertext documents. Like other Internet tools, such as FTP, WAIS, or Gopher, HTTP is a client-server protocol. In the client-server model, a client program running on the user's machine sends a message requesting service to a server program running on another machine on the Internet. The server responds to the request by sending a message back to the client. In exchanging these messages the client and the server use a well understood protocol. FTP, WAIS, and Gopher are other examples of Internet client-server protocols, all of which are accessible to a World Wide Web browser.

The HTTP protocol is designed expressly for the delivery of hypertext documents. At the simplest level, HTTP servers act much like anonymous FTP servers, delivering files when clients request them. However, HTTP servers support additional important features including the ability to return to the client not just files, but also information generated by programs running on the server and the ability to take data sent from the client and pass this information on to other programs on the server for further processing. These special server site programs are called gateway programs, because they usually act as a gateway between the HTTP server and other local resources, such as databases. Just as an FTP server can access many files, an HTTP server can access many gateway programs; in both cases, you can specify which resources, files, or programs you want through a URL. The interaction between the server and these gateway programs is governed by the Common Gateway Interface (CGI) specifications. Using the CGI specifications, a programmer can easily write simple programs or scripts to process user queries, interrogate data bases, make images that respond to mouse clicks, download a program to the client machine or any number of other functions.

The Hypertext Markup Language, or HTML, is the language used to prepare hypertext documents. HTML contains commands, called tags, to mark text as headings, paragraphs, lists, quotations, emphasize and so on. It also has tags for including images within the documents, for including fill-in forms that accept user input, and most importantly, for including hypertext links connecting the document being read to other documents or Internet resources such as WAIS databases and anonymous FTP sites. Hypertext links allow a person to click on a string of highlighted text and access a new document, an image, or a movie file from a computer thousands of miles away. The document is specified by URL, which is included in the HTML markup instruction and which is used by the browser to find the designated resource. URLs can point to other HTML documents, pictures, sound files, movie files, or even database search engines. They can be on a local computer or anywhere on the Internet. They can be accessed from HTTP servers or from FTP, Gopher, WAIS, or other servers.

Internet Protocol Multicast (IP Multicast) is a client-server protocol which provides one-to-many and many-to-one communications capability across the Internet. This is substantially different from the traditional one-to-one or point-to-point connections that most current LAN and WAN applications support. Multicasting allows for video conferencing, electronic whiteboards and other multimedia uses for networks as well as non-multimedia applications such as updating mail server databases.

IP Multicast allows the same message to be sent to many locations at once instead of sending the same message to single locations over and over again. IP Multicasting allows routers to efficiently locate routes to many networks and endusers at once. The protocol also allows a single copy of each packet to be sent on a shared link and ensures that packets are only sent to links that have at least one recipient, thereby addressing both networking load and security concerns.

IP Multicast requires destination hosts wanting to receive a multicast to subscribe (register), using the Internet Group Management Protocol (IGMP). IGMP also supports other related functions, such as leaving a multicast group or specifying an alternate route. Subscribing is done by specifying the Class D IP address used for the particular multicast (similar to tuning to a particular radio station). Routers track such IGMP requests and build a connectivity tree for each possible sender to each registered receiver. When multicast traffic is received from a particular sender, the router uses its tree for that sender to determine on which ports traffic needs to be forwarded. IP Multicast, IGMP, and PIM are further described and defined in *RFC* 1112 and *MBONE Multicasting Tomorrow's Internet*, Savetz, Randall and Lepage, IDG Books, Foster City, Calif. 1996.

There are three potential router to router protocols to support routers dynamically learning which multicast group's data need to be sent out which ports. This process is commonly referred to as building trees and the protocols are: Protocol Independent Multicast (PIM) (supported by the ITF and Cisco) which works with more protocols than just TCP/IP; Distance Vector Multicast Routing Protocol (DVMRP, used by MBONE and supported by Bay Networks); and Multicast Open Shortest Path First (MOSPF, supported by Proteon). Apple Simple Multicast Routing Protocol (SMRP) provides similar capabilities but currently only for Appletalk traffic from applications such as Quicktime Conference.

The most common of the router protocols is Protocol Independent Multicast. PIM's big advantage is that it supports multicast traffic over existing unicast routing protocols, such as IGRP, IS—IS, OSPF, and RIP. Protocol Independent Multicast is further defined as having two distinct modes, dense-mode PIM and sparse-mode PIM.

Dense-mode PIM is intended for networks in which most LANs need to receive the multicast (such as LAN TV, corporate information broadcasts, and other broadcast events). It uses reverse path forwarding, in which the traffic is initially sent to (flooded) all router interfaces (except the one on which it arrived). Downstream routers that do not need a traffic feed (either because they have no receivers on their interface or because they are already receiving the feed from another port) reply with a prune message, asking to be removed from the forwarding list (the tree).

Sparse-mode PIM is generally intended for networks in which several different multicasts (each going to a small number of receivers) are typically in progress simultaneously (such as desk top video conferencing, collaborative computing, and whiteboard applications). Senders and receivers first register with a single router, which is designated the rendezvous point. Traffic is sent by the server to the rendezvous point, which then forwards it to the registered receivers. As intermediate routers see the source and destination of the multicast traffic (it is unlikely that the best path from the source to destination goes through the rendezvous point), they optimize the paths so that the traffic takes a more direct route (likely bypassing the rendezvous point). Traffic is still sent to the rendezvous point, in anticipation of new receivers registering.

One of the most prominent developments to arise out of multicasting has been a shift in the way in which information is gathered and distributed on the Internet. Traditionally, information distribution has occurred through the client-pull model. The new paradigm for information retrieval and distribution is the server-push model.

An example of the client-pull model is a user directing a browser to a particular URL (this is a request for information), the server responds by transferring the HTML associated with the specified URL via HTTP, the user's browser decodes the HTML and displays the hypertext document it defines. This is how the user's client application, the browser, "pulls" information off the server. Often the retrieved hypertext document will have tags referring to other URLs which the user can access by selecting the tag and thereby "pulling" even more information off the server.

In the server-push model, a server multicasts ("pushes") information over a communication channel were it can be accessed by multiple clients by tuning into the appropriate channel much in the same way a television is tuned. The new push technology category of software solves three major problems. First, it reduces the bandwidth used by users who are continuously accessing news services via their browsers. Second, because the channels are organized by topic, it frees the user from having to search through information they are not interested in viewing. Third, it allows for greater control over what the users can access, a distinct advantage in an educational or corporate environment.

The server-push model also enhances the options for information distribution across an enterprise. Users can be provided with custom data from news services and other Websites. Users can send out personalized messages with requests for responses, they can send multimedia files, and even request information from remote databases. These messages can be sent in a variety of means, including pop-up boxes, ticker tapes, screen savers, and wallpaper.

The server-push model and the wide variety of "push" technologies derived from it have provided the user with new sources of information and may reduce the amount of time spent actively searching the Internet for information. However, there is as of yet no coherent method for the user to identify what information he wants to receive. In most prior art implementations the user has only limited options for filtering the information being "pushed" at him/her. Furthermore, most prior art implementations of push technology limit the response available to user. In many instances the user gets a URL pushed at him so that he/she ends up reverting to the traditional client-pull model. There is a need for a push based information distribution method which provides a users with a coherent means for filtering what information is received and intelligently responding to the information. There is a further need for a push based information system that is not based upon a store-and-forward model. There is yet a further need for an information server which does not retain any third party information and is therefore able to minimize the need for scale dependent server hardware and the operational complexity associated with a large datacenter.

SUMMARY OF THE INVENTION

The present invention, referred to as a Timely Information Server, is a real-time notification system available to Internet, intranet, LAN, and WAN users. The Timely Information Server is comprised of a method and device for managing and distributing information (in the form of alerts divided into a keyword-part and an argument-part) over a data network. The invention is based upon the server-push model and delivers user notifications of new information posted by participating content providers (referred to as Timely Information Providers) via IP Multicast. In the preferred embodiment, the device on which the client portion of the present invention is implemented is a personal computer connected to a computer network. However, the client may also be implemented as part of a television based information retrieval system or some other device designed to receive the alert signals. While the preferred embodiment uses Internet Protocol Multicast (IP Multicast), alternative broadcasting protocols may be used.

Users can monitor any number of Timely Information Server channels with client software that runs outside of a web browser. Different channels broadcast alerts concerning different types of information (e.g. news, weather, traffic, sports, advertisements, stocks). When an alert is received that meets a predefined set of notification criteria (satisfies a Boolean equation) the client software will execute a program associated with the alert. In the preferred embodiment, when an alert is received that satisfies the notification criteria, a message box containing the alert headline is displayed to the user. Clicking on the message box causes the user's browser to link to a URL associated with the alert (the URL is contained in the argument-part of the alert) and view the details of the story. Alternatively, satisfying the notification criteria may also cause the computer to execute a program that does not require any user intervention.

In the preferred embodiment, the Timely Information Server receives computer readable records (alerts) containing information (in the form of keyword and argument subrecords) from numerous Timely Information Providers, organizes and indexes the information, and broadcasts the information to a plurality of client computers using IP Multicast. The information is organized and indexed by storing the information contained in the record in one or more subrecords referred to as arguments and associating one or more descriptive keywords with the arguments. Both the keywords and the arguments may be elements of the Boolean function used to determine whether or not the notification criteria have been satisfied. In one embodiment a Boolean operation is preformed on the keywords as a first filter and a second Boolean operation examines the contents of the arguments to determine if the alert should be presented to the user or cause the execution of a predefined program. In general, keywords identify the subject matter of the information while the arguments provide content. All of the possible keywords are predefined by the Timely Information Server and are stored in a keyword dictionary on the server.

The notification criteria are based upon a combination of keywords or keywords and arguments arranged as a boolean function. It is the keywords which determine whether or not a incoming record will be evaluated to see if it meets the notification criteria. The keywords used to define the notification criteria are the same as those assigned to an information record by the server and are also taken from the keyword dictionary. The notification criteria are stored in the keyword profile database on the client's computer. If the notification criteria are satisfied, then the user is provided with an alert.

The user sets up his/her keyword profile by either directly or indirectly selecting keywords. Directly selecting keywords refers to the user choosing keywords from the server's keyword dictionary and forming them into the Boolean expressions that are used as notification criteria. Indirect selection may also be used where users would prefer to answer a series of natural language questions and have the software set up the notification criteria. The default action to be taken by the system when notification criteria are satisfied is to display a headline which is one of the arguments and to present the user with the option of viewing an associated webpage through a linked browser.

Alerts may be either visual or auditory and may or may not require some form of user interaction. As discussed, the preferred embodiment of the present invention provides the user with a pop-up window with the headline of the alert (information record) that has satisfied the notification criteria. Clicking on the window takes the user to a web page associated with the alert. As discussed, some alerts may require user interaction such as clicking on a window to follow a URL. Other alerts may automatically take the user to a particular web page and then cause a Java applet or ActiveX control to be executed.

Another feature of the present invention is that it relays tracking information to the Timely Information Server or a separate Tracking Server. This tracking information may include which alerts the user has viewed as well as which alerts he/she has responded to. This tracking information is used to develop and refine personal profiles of the users. It may also be used by the system to suggest other keywords or multicast channels that might be of interest to the user.

The system of the present invention can be programmed to carry out other functions beyond displaying a headline and linking a browser to an associated URL. The system can be instructed to run one or more programs with or without user interaction in response to the satisfaction of notification criteria. These programs can be used to perform any function that a computer can be programmed to perform.

In one embodiment, the system could be used to monitor or buy and sell commodities in response to a preprogrammed set of market conditions that are relayed to the system via alerts. In operation, the user would select a multicast channel that broadcasts commodity information about the market he/she is interested in. The channels may be organized along the same lines as the traditional markets (NASDAQ, NYSE, AOC, etc.) or there may be channels which focus on a single industry, state, or other organizational hierarchy that contains stocks from one or more markets. The keyword-part of the alert would contain the company name, while the argument-part of the alert would contain information about how the commodity is trading. If the alert notification criteria are met, the present invention could display a headline containing a URL linking to more information about the commodity or run a commodity purchasing program which would then by or sell a preprogrammed amount of the commodity. The commodity purchasing program could base its decisions on a single alert or a combination of one ore more alerts along with other information.

In another embodiment, the system could be used to identify merchandise for sale (e.g. computer equipment, clothing, iguanas, real estate) when a particular item becomes available at a particular price or satisfies other criteria. The system could alert the user that the product is available and provide a URL for the user to link to in order to find out more about or purchase the product. Alternatively, the system could also execute a purchase merchandise program when the preprogrammed criteria are satisfied. The user would have the option of tuning into multicast channels organized by product description (laser printers, blue jeans, used cars, homes for sale in Seattle, etc.), by manufacture (NEC, IBM, Eddie Bauer, Victoria Secret, etc.) or by retailer (Nordstrom's, Sears, Wallmart, etc.).

A similar method could also be used for the purchase of airline tickets. The user would set the notification criteria to find an airline flight that matches his/her needs. The keyword-part of the alert describes the price, destination, date and time of travel, airline, and other necessary information and the argument-part of the alert contains supplemental information about the flight. The alert would also contain a URL that would take the user to a website where he/she could purchase airline tickets. Alternatively, matching the notification criteria could cause the execution of a program which actually purchased the tickets for the user without any further intervention beyond defining the purchasing criteria (flight description, any additional requirements, and how much to spend).

Yet another embodiment would use the present invention to advertise rental properties. A Timely Information Provider could send out alerts describing available properties and provide a URL to find out more information about the property or arrange to see the property in person. The keyword-part of the alert could be used to categorize the property. Rental property keywords would include location (e.g. Mercer Island, Seattle, Bellevue), cost per month (e.g.

$875.00/month), type of property (e.g. house, apartment, condo), number of bedrooms (e.g. 1, 2, 3, 4), and other keywords necessary for determining whether it is worth the bother for a renter to even look at an advertisement. The argument-part of the alert could contain supplemental information about the available property.

In part of an entertainment system (integrated with a television based web browser), the satisfaction of the notification criteria would cause the client software to run a channel changing program which pauses any video devices currently in use and tunes in to a preferred news channel. This way the user can be kept abreast of information he/she wants to be notified about but does not have to constantly monitor a news channel or even go to the effort of checking it periodically. In this example, the news channel could be a radio, television, or Internet based news service.

As discussed above, the multicast signal used in the present invention may be broadcast via the Internet, an intranet, a satellite, or a ground based radio transmission. With the further development of wireless communications it is likely that the multicast receiver could be embedded in devices other than computers such as radios, televisions and other communication devices.

These and other features of the present invention will be more fully appreciated when considered in light of the following detailed description and drawings.

BRIEF DESCRIPTION OF THE DRAWINGS

FIG. 5 is a functional diagram of the present invention.

FIG. 8 is a functional diagram of the keyword and argument data structure of the present invention.

DETAILED DESCRIPTION OF THE INVENTION

Figure 1:
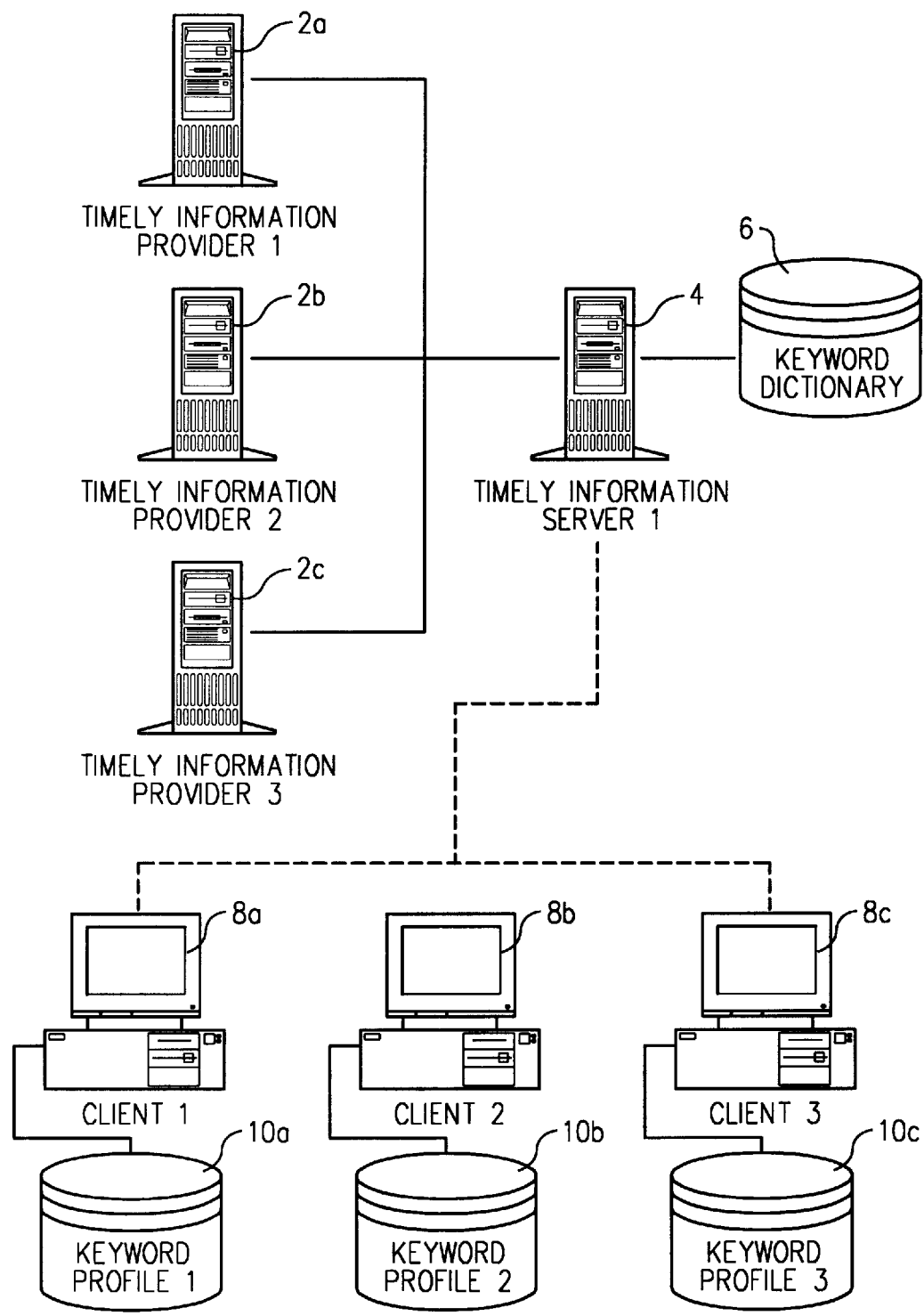
FIG. 1 is a functional diagram of the present invention.

FIG. 1 illustrates the preferred embodiment of the present invention and shows the Timely Information Providers 2a, 2b, and 2c sending information to the Timely Informatiorr Server 4. The Timely Information Server analyzes the incoming information and compares it with its Keyword Dictionary 6 to create an alert composed one or more keywords and one or more arguments. Typically there will be multiple keywords that describe the subject of the alert and multiple arguments including information source identification, a headline, a unique alert identification, and a URL. The Timely Information Server sends the alert over a computer network using IP Multicast. The alert is received by the subscriber clients 8a, 8b, and 8c. The clients 8a, 8b, and 8c compare the keywords in the alert to their local keyword profiles 10a, 10b, and 10c using a predetermined logical (Boolean) expression also referred to as the notification criteria. The client computers then display the alerts that satisfy the notification criteria. If the user selects the displayed alert, then a linked browser will connect to an associated URL (contained in an argument in the alert).

Figure 2:
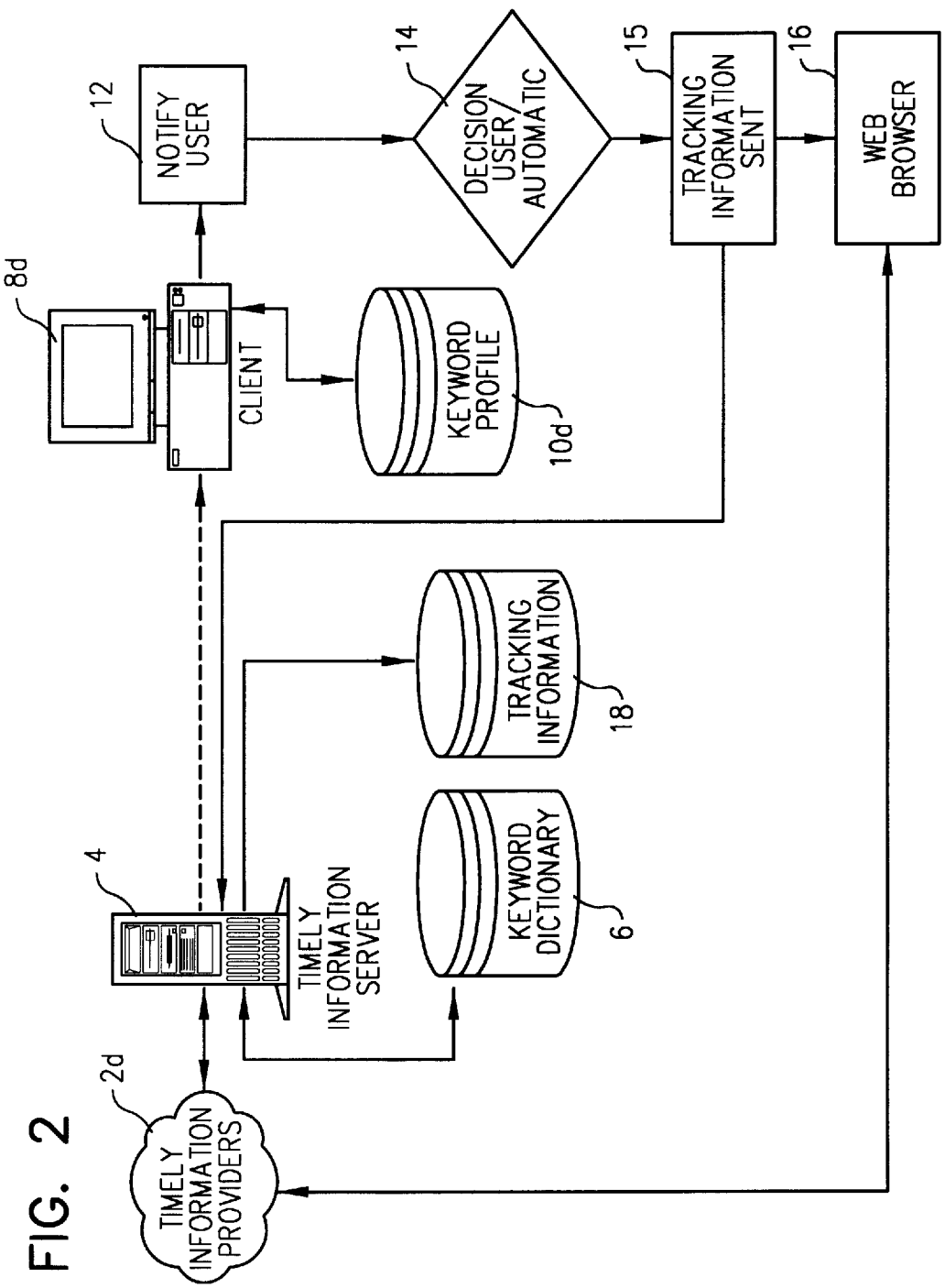
FIG. 2 is a functional diagram of the present invention.

In FIG. 2, one or more Timely Information Providers 2d post new content on their Internet Servers (HTML, FTP, WAIS, GOPHER, Etc.). The Timely Information Providers 2d send information to the Timely Information Server 4. Alternatively, the Timely Information Server 4 could go out and collect information from the Timely Information Providers 2d. The Timely Information Server analyzes the incoming information and compares it with its Keyword Dictionary 6 to create an alert. The Timely Information Server 4 sends the alert over the network. The alert is received by the client computer 8d. The client 8d compares the keywords in the alert to their local keyword profile 10d using a predetermined logical (Boolean) expression. If the notification criteria is satisfied, the client machine notifies the user to the presence of an alert 12. The user then chooses to request the information 14 which uses a separate application such as a WWW Browser 16 which displays one of the Timely Information Providers' information based on one or more arguments contained in the alert. In the alternative, other devices such as a telephone, radio, or television could be used instead of the WWW browser 14 to retrieve the information associated with alert.

At the same time the client 8d retrieves information from the Timely Information Providers 2d, a tracking information packet is sent 15 to the Timely Information Server 4 specifying that the user/client has acted upon the received alert. The client machine 8d may just indicate that an alert was acted upon or it may specify which alert was acted upon by transmitting the unique alert ID. The Server 4 also maintains a current copy of the user's notification criteria, and the client 8d transmits a start time and a stop time that identifies when the client 8d was receiving alerts. By specifying the start and stop times and knowing the notification criteria, the Timely Information Server 4 can identify which alerts have been viewed by the client 8d. Tracking information packets are stored by the Timely Information Server 4 in the tracking information database 18.

Figure 3:
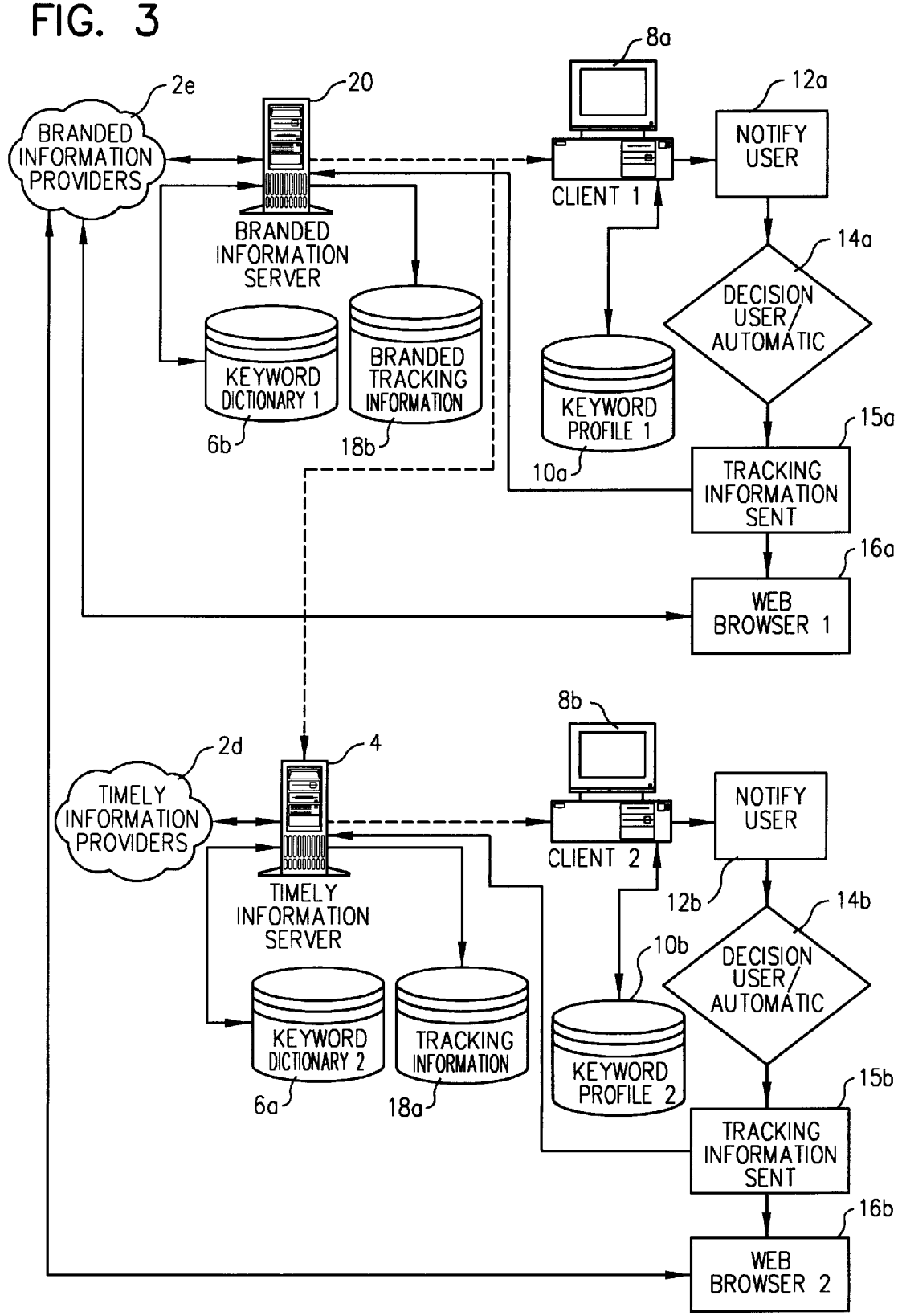
FIG. 3 is a functional diagram of the present invention.

In FIG. 3, Branded Information Providers 2e post new content on their Internet Servers. Branded Information Providers 2e send information to the Branded Information Server 20. The Branded Information Server 20 analyzes the incoming information and compares it with its Branded Information Server Keyword Dictionary 6b to create an alert. In the preferred embodiment, the Branded Information Server Keyword Dictionary 6b has the same set of keywords as the Timely Information Server Keyword Dictionary 6a. The Branded Information Server 20 sends the alert over the network via IP Multicast to client 8a who has subscribed (registered) to receive alerts from the Branded Information Server 18. Client 8a compares the keywords to their local keyword profile 10a and notifies user to the presence of an alert 12a that satisfies the notification criteria. The user then chooses to request the information 14a which uses a separate application such as a WWW Browser 16a to display a webpage from the Branded Information Provider 2e. Tracking information about which alerts the client 8a has responded to is sent 15a to the Branded Information Server 20 where it is stored in the branded information tracking database 18b.

The Timely Information Server 4 also receives alerts from the Branded Information Server 20 and forwards them as Timely Information Server 4 alerts where they are received by client 8b. If client 8b responds to any of the alerts, tracking information is sent 15b to the Timely Information Server 4 and stored in the tracking information database 18a. The alerts provided by the Branded Information Server 20 to the Timely Information Server 4 can be the same as those provided to client 8a or they may be modified. Alternatively, clients responding to an alert that originated with from a Branded Information Server 20 could be provided less access to the Branded Information Provider's webpages or may have to view advertisements along with the content.

Figure 4:
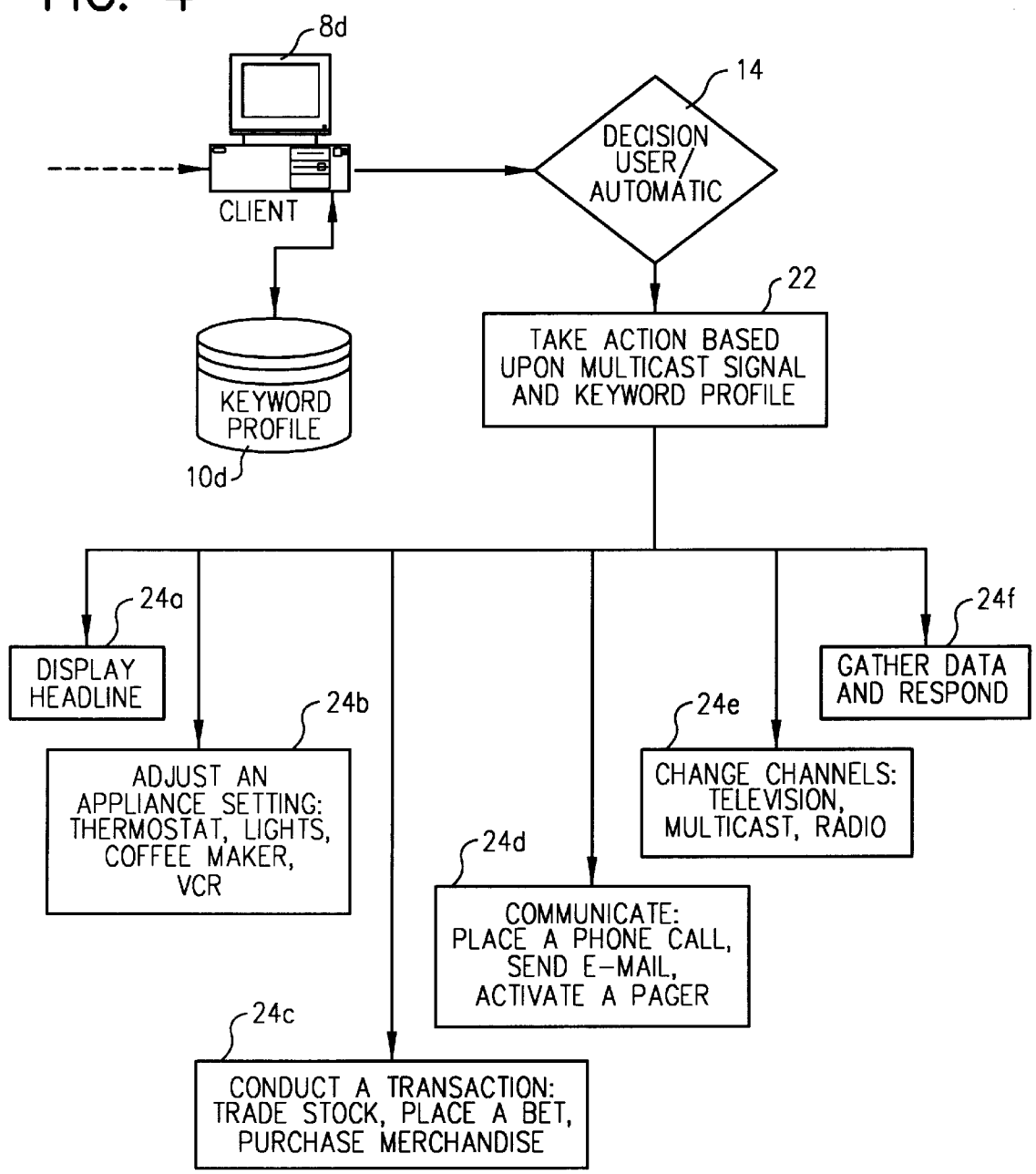
FIG. 4 is a functional diagram of the present invention.

In FIG. 4, the alert is received by the client 8d. The client 8d compares the keywords to the local keyword profile 10d using a predetermined logical (Boolean) expression. If the notification criteria is satisfied, the client machine either notifies the user that there is an alert that satisfies the notification criteria or responds automatically to the alert by executing a preprogrammed set of instructions. After determining that the alert meets the notification criteria, any necessary user input is retrieved or any decisions which require further computation are made 22 and a response program 24a, 24b, 24c, 24d, 24e, and 24f is executed.

The present invention will have the common response programs available by default. One of the most common programs will be the display headline program 24a wherein an alert headline is displayed and the user is given the option of linking to an associated URL via a browser or dismissing the alert. In the preferred embodiment, the user can have the client automatically dismiss alerts if they have not been selected within a prescribed time limit.

If the client 8d is connected to an appliance, an adjust settings program 24b could be executed to reprogram or change an appliance's settings in response to an alert. An example of this would be a VCR that can be instructed to record a particular type of program. The client 8d would receive alerts providing information about upcoming television programs. If any of the alerts satisfied the alert notification criteria stored in the Keyword profile, then a change settings program 24b would be run and the program would be recorded.

Numerous other programs could also be executed. The user can choose to, or the client can automatically, conduct a transaction such as place a trade, place a bet, or purchase merchandise in response to an alert by executing a conduct transaction program 24c. The user can choose to, or the client can automatically, communicate via email, phone call, or pager, in response to an alert by executing a communication program 24d. The user can choose to, or the client can automatically, change the channel on a television, multicast receiver, or radio by having a change channel program 24e execute in response to an alert. A data gathering and response program 24f could be executed in response to an alert. An example of this might be a program that checks for traffic on the user's route home in response to a weather report and then notifies the user that he/she will have to leave work before a certain time to arrive home by a certain time.

FIG. 5 shows client 8d retrieving a portion of the keyword dictionary from the Timely Information Server 4 and creating a local copy of the keywords in the keyword profile 10d. The client 8d then defines the notification criteria and stores the criteria in the keyword profile 10d. In the preferred embodiment, the client 8d connects to a webpage on the Timely Information Server 4. In one embodiment, the user builds the notification criteria he/she wishes to use by answering a series of questions presented by a setup webpage and then downloads his/her notification criteria to keyword profile 10b. Alternatively the keyword profile 10d may contain all of the words in the keyword dictionary and the software on the client machine may enable the user to change his notification criteria at any time without having to reconnect to the setup webpage on the Timely Information Server 4.

Figure 6:
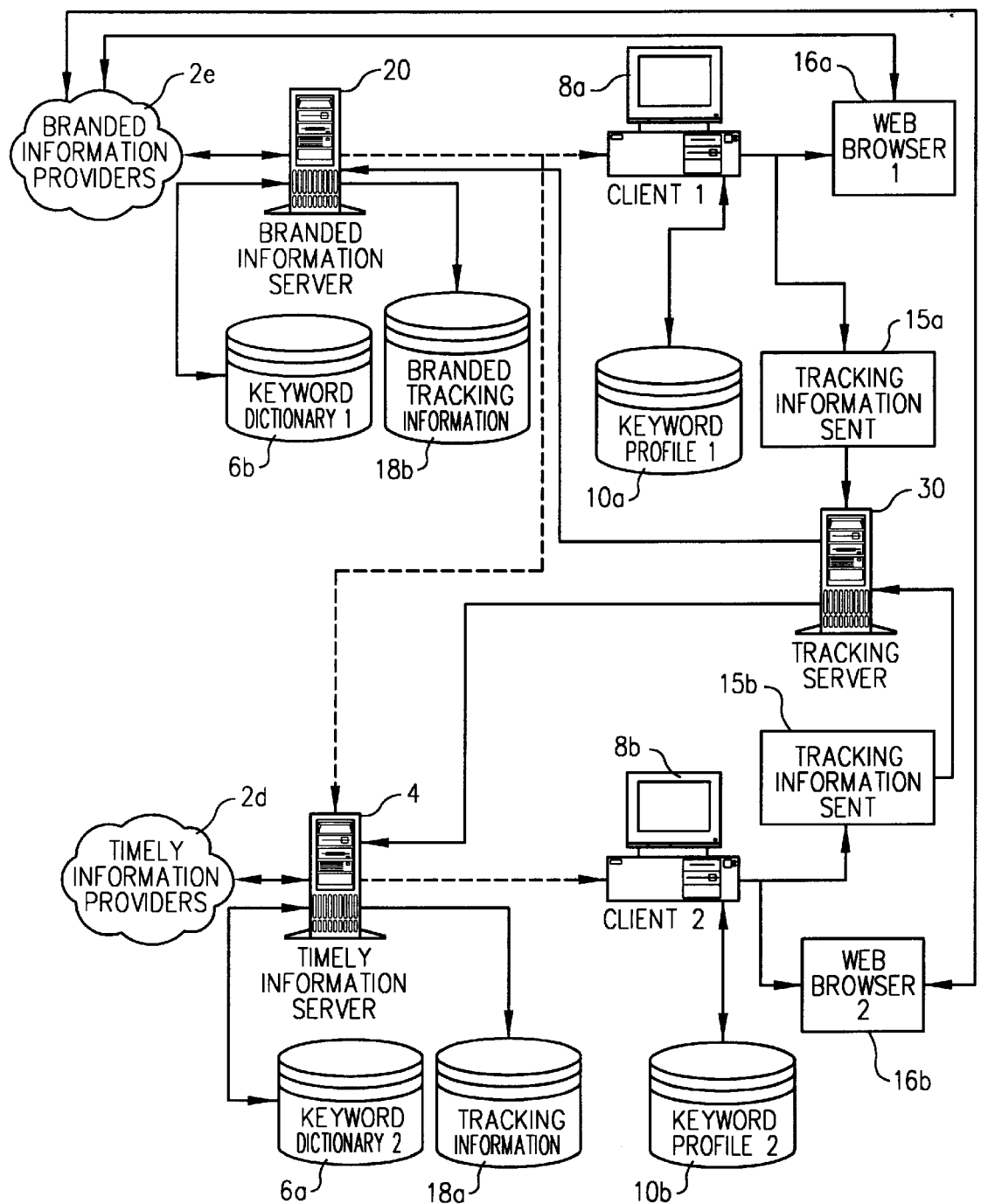
FIG. 6 is a functional diagram of the present invention.

FIG. 6 illustrates the use of a Tracking Server 30 with a Timely Information Server 4 and Branded Information Server 20. The Tracking Server 30 records the tracking packets sent 15a and 15b out by client computers 8a and 8b when the user clicks through to a URL in response to an alert. The Tracking Server 30 allows the Timely Information Server 4 and Branded Information Server 20 to identify who is viewing their information and from where they are receiving their alerts.

Figure 7:
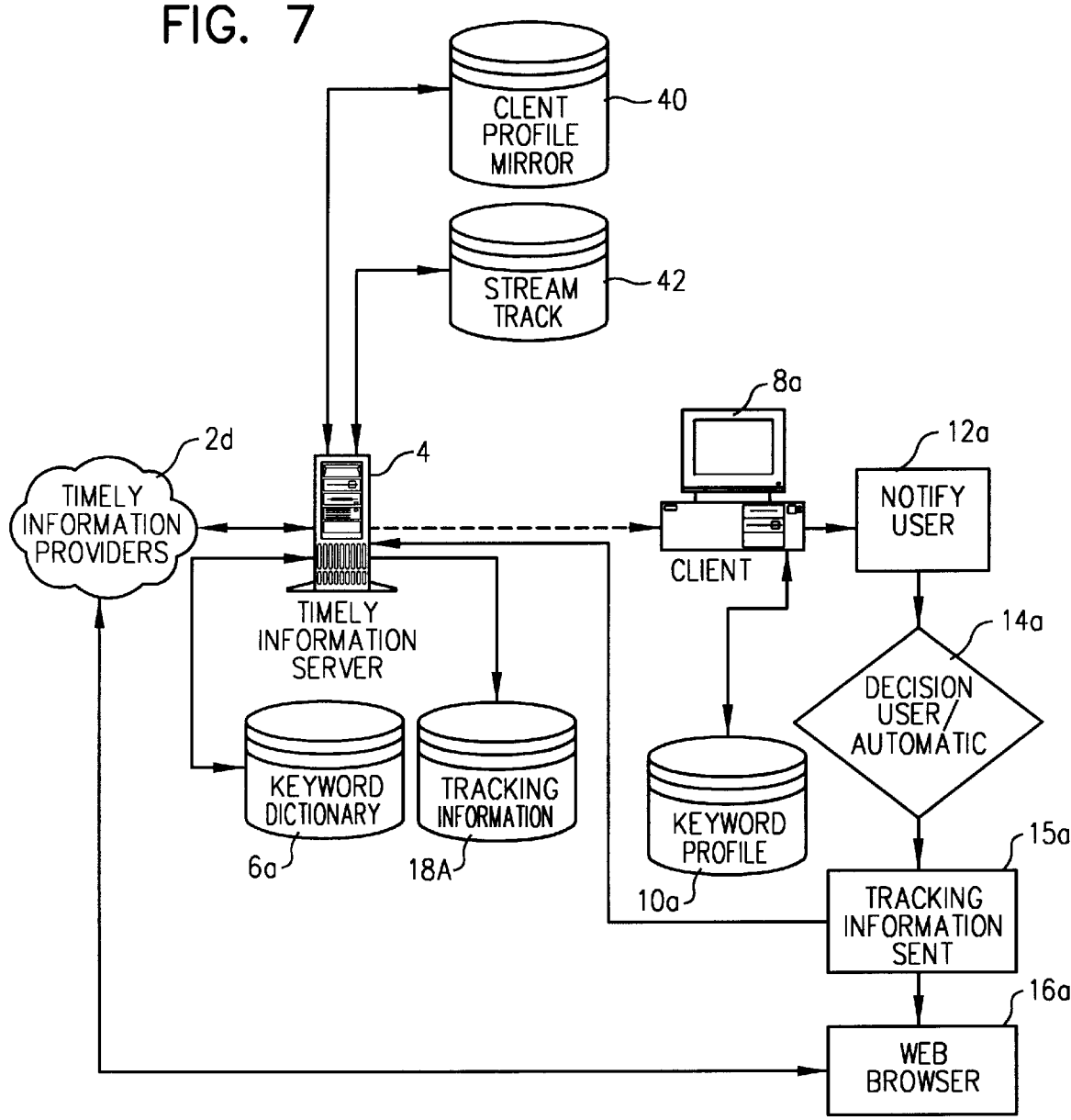
FIG. 7 is a functional diagram of the present invention.

FIG. 7 illustrates how the Timely Information Server 4 identifies which alerts a client 8d has received. As discussed earlier, when a client clicks on a headline to link to an associated URL, a tracking packet is sent 15a to the Timely Information Server 4. The Timely Information Server 4 also keeps a record of when the client is receiving alerts and has a copy of the client keyword profile in the client profile mirror 40. The Timely Information Server keeps a record of streamed alerts in the stream track database 42. Since the client 8a provides a start and stop time as to when they were receiving keywords, the Timely Information Server 4 can compare the time the user starts and stops receiving alerts with the stream tracking database 42 and the client profile mirror 40 to determine what alerts the user received. Combined with information from the Tracking information database 18a, reports showing which alerts where responded to out of a group of alerts viewed can be generated.

FIG. 8 shows two types of alerts comprised of keywords and arguments, a multiple keyword/multiple argument (MKMA) alert 50 and a single keyword/multiple argument (SKMA) alert 56. Keywords 52a, 52b, 52c, 52d, and 52e are records which describe the alert and are used to execute the notification criteria which are in the form of a Boolean expression. Arguments 54a, 54b, 54c, 54d, 54e, and 54f are records which contain the content of the alert and are used by the client application to execute an action once the Boolean expression is satisfied.

MKMA alert 50 is comprised of 4 keywords 52a, 52b, 52c, and 52d which describe the alert. The 3 arguments that make up MKMA alert 50 provide the headline 54a that is to be displayed to the user, a URL 54b to be linked to by the browser if the user selects the displayed headline, and time stamp 54c that indicates when the alert was sent out.

SKMA alert 56 is an example of an alert that is used as part of a stock ticker application. It has only 1 keyword 52e which provides a stock market symbol for a commodity and three arguments that provide the price 54d, volume 54e, and time stamp 54f for the commodity.

Figure 9:
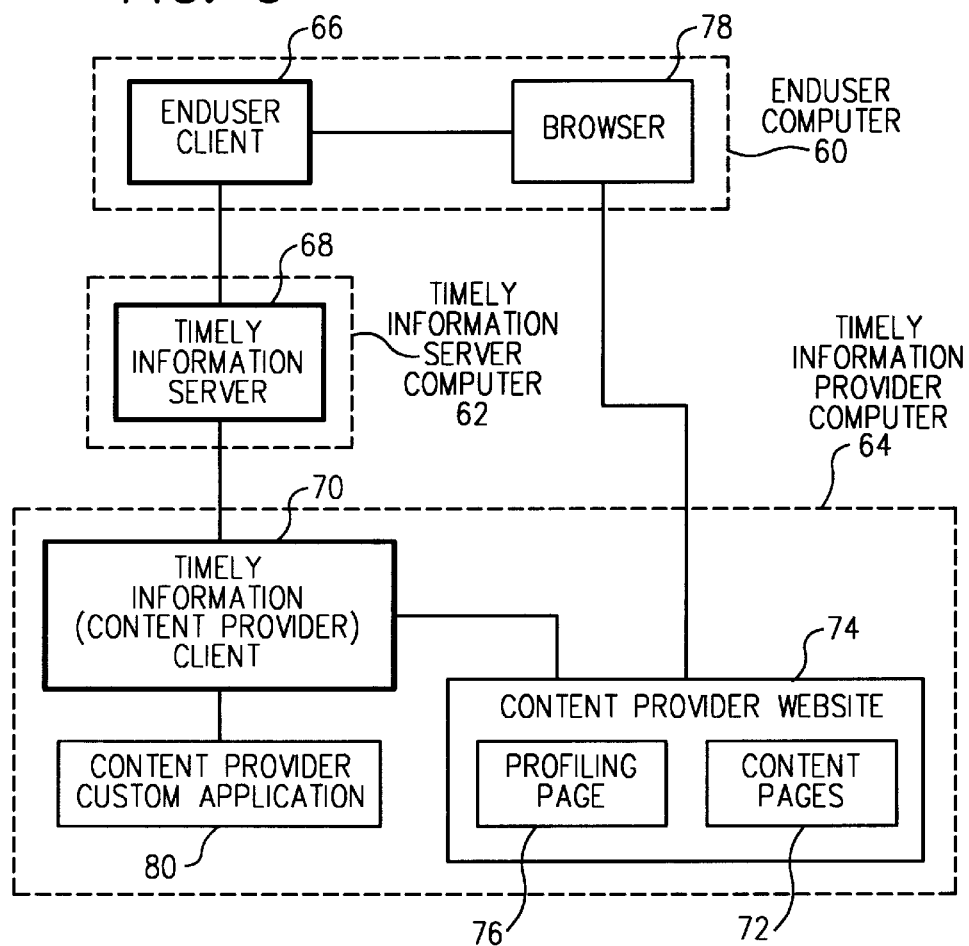
FIG. 9 is a functional diagram of the overall architecture of the software of the present invention.

FIG. 9 illustrates the overall architecture of the software of the present invention. The enduser computer 60 is connected to the Timely Information Server computer 62 which in turn is connected to the Timely Information Provider computer 64. The preferred method of the present invention is comprised of three applications; an Enduser Client (EU Client) 66 running on the enduser computer 60, the Timely Information Server (TIS) 68 running on the Timely Information Provider computer 62, and a Timely Information Provider Client (also referred to as a Content Provider Client or CP Client) 70 running on the Timely Information Provider Computer 64. The applications communicate with each other via application level protocols, generally referred to as transport protocols, running on top of the Internet Protocol (IP). The transport protocols can be further divided into the Enduser Transport and the Timely Information Provider Transport.

The Enduser Transport is used for communication between the Enduser Client 66 and the Timely Information Serve 68. The present invention uses a combination of UDP/IP and TCP/IP as transport-level protocols. As UDP is the only IP protocol that is supported when multicasting, it is used to stream alerts to end users. TCP is used for managing data loss recovery and for tracking purposes.

The Timely Information Provider Transport is used by the Content Providers (Timely Information Providers) for communication between the CP Client 70 and the Timely Information Server 68. The Timely Information Provider Transport uses TCP/IP in unicast mode for a transport-level protocol and provides for alert submission, alert indexing, dictionary updating, and site monitoring.

The Enduser Client 66 is used to monitor the multicast channels and notify users of relevant alerts. It interfaces with the user's browser, which is used both to access the real time content as well as define an interest profile. The Enduser Client application 66 provides for channel monitoring, alert notification, user click-through tracking and enduser options.

To provide channel monitoring, each channel relates to a specific subject matter (e.g. US Company News, European Soccer Scores, current prices for varanids) and broadcasts alerts to all subscribers to that channel. Channels can be selected by a specific function in the Enduser Client 66 or by clicking on an HREF on a content page 72 of a Timely Information Provider Webpage 74 which also includes profiling pages 76. Channels can be encrypted to prevent unauthorized monitoring (e.g. subscription-based real-time quotes services).

Alert notification begins with a user initially defining a profile of interest (i.e. a set of keywords and optionally a search expression) through a Profile Definition Web Page upon registering with the Timely Information Server 68 for the first time and a keyword profile file is created on the user's machine. The profile can be updated by accessing the Timely Information Server's or a Timely Information Provider's profile definition webpage 76 at any point in time. When an alert's keywords meets the filtering criteria defined in the user's keyword profile, the client application alerts the user (by sound signal, maximizing itself if minimized, etc.). The alert's headline is displayed, along with a "Click Here for more info" button.

The Enduser client also tracks user click-through. Clicking on the "Click Here for more info" button will cause a web browser 78 to (launch if not running and) link to the URL contained in the alert, allowing the user to view the details of the alert. The Enduser Client 66 also sends a brief click-through notification to the Timely Information Server 68 or a Tracking Server for tracking purposes.

The Enduser Client 66 also manages enduser options such as notification methods, channels to listen to, headline display format, and any other user definable options.

The present invention accepts information from three types of Timely Information Providers (content providers): active providers, independent providers, and passive providers. Active content providers submit pre-formatted, pre-tagged and pre-indexed alerts to the Timely Information Server. This guarantees the speediest delivery of the notification and the most accurate tagging and indexing of the information. Independent providers perform all the functions of an active provider and opt to stream a "private" Timely Information Server channel or set up an independent Branded Information Server which combines the functions of providing content and serving information. Passive providers do not require the timeliest delivery of the alert, or do not wish to manage the process of tagging and indexing the alerts. In this case, the Timely Information Server 68 regularly monitors (automatically and/or manually) the participating content provider's website 74 and then formats, indexes and transmits the alerts. The monitoring frequency depends on the nature of the information.

While passive providers do not need to run any Timely Information Server 68 specific applications, active and independent content providers need to run the Timely Information Provider Client 70. The Timely Information Provider Client 70 may be utilized in conjunction with a Timely Information Provider Custom Application 80 (designed to generate alerts by interfacing directly with the content production process), and/or by manual submission of alerts. The CP Client 70 also functions as an interface between the Timely Information Provider Profile Definition Page 76 on the Timely Information Provider Web Site 74 and the Timely Information Server 68. The Timely Information Provider Client 70 provides for indexing, alert submission, dictionary management, and manual submission of alerts.

In the preferred embodiment, indexing is performed by accessing the Timely Information Server Keyword dictionary remotely through a high-speed (T1) TCP-IP connection and a Timely Information Server Content Provider DLL.

Alert submission is handled by transmitting the alerts directly to a Queue Manager through the Timely Information Provider Client 70. Alternatively, the Timely Information Provider may generate a pre-formatted, pre-tagged but un-indexed alert which is sent to the Timely Information Server 68, which in turns does the indexing.

Dictionary management allows the Timely Information Providers to create and manage a set of Timely Information Provider specific keywords within the Timely Information Server Keyword Dictionary. The Timely Information Provider Client allows remote and secure access to the Timely Information Server Keyword Dictionary.

The Timely Information Provider Client 70 allows the Timely Information Provider to send alerts manually in addition to or in lieu of using an automated process.

The Timely Information Server 68 communicates with both the enduser computer 60 and the content provider computer 64. It hosts a proprietary keyword dictionary used to index alert notifications and manages the distribution of incoming alerts through a number of alert channels. The Timely Information Server also provides for channel Streaming, alert prioritization, dictionary management, user profile mirroring, tracking, stream tracking, alert indexing, and site monitoring.

Together, the Enduser Client 66, the Timely Information Provider Client 70, and the Timely Information Server 68 applications govern all aspects of the present invention.

Figure 10:
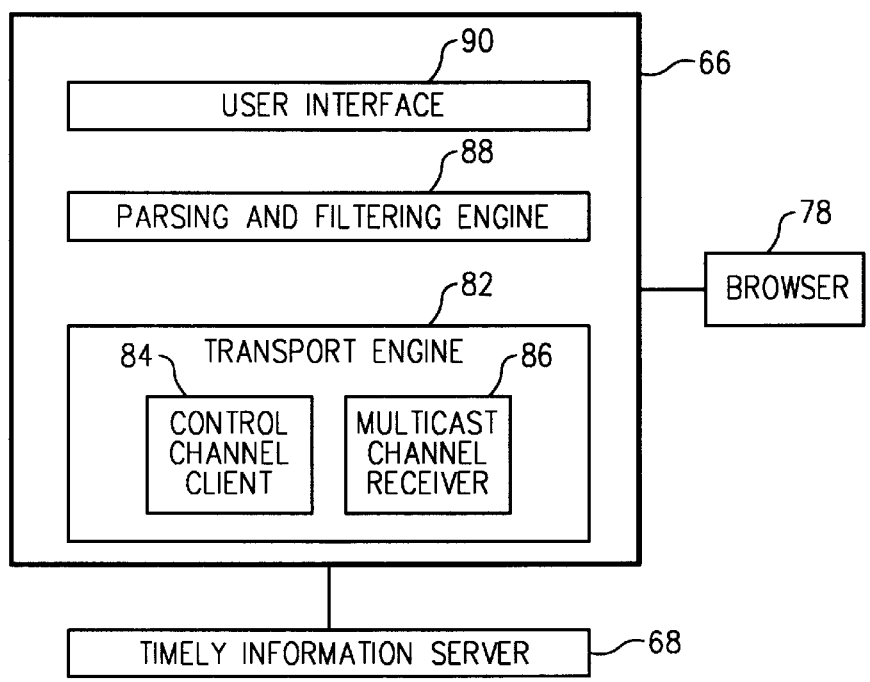
FIG. 10 is a functional diagram of the Timely Information Client Software of the present invention.

Referring to FIG. 10, the Enduser Client 66 is comprised of a Transport Engine 82, which includes a Control Channel Client 84 and a Multicast Channel Receiver 86, a Parsing and Filtering Engine 88, and a User Interface 90. In the preferred embodiment the Enduser Client 66 will also be associated with a web browser 78.

The Enduser Client 66 communicates with the Timely Information Server 68 via the Control Channel Client 84 and the Multicast Channel Receiver 86. The Enduser Client 66 application may be launched by running the executable or may be activated by clicking on a Timely Information Server HREF on a Timely Information Provider's Webpage 74. This will cause the Timely Information Provider's multicast channel to be added to a list of active channels in the Enduser Client 66. The Timely Information Server HREF is identified by a specified file type and protocol.

The User Interface 90 provides notification to the Transport Engine 82 when a click through notification needs to be sent to the Timely Information Server 68. This occurs whenever the browser 78 is activated.

The Parsing and Filtering Engine 88 analyzes each incoming alert and detects whether the alert notification criteria are satisfied. The parsing portion of the engine 88 is responsible for extracting all the individual information items (keywords and arguments) from the incoming alert and storing them in memory variables. The filtering portion of the engine 88 is responsible for detecting whether the alert is a hit using the information in the keyword profile. The Parsing and Filtering Engine 88 also passes hit notification to the User Interface 90 for click-through notification.

A Keyword Profile file is created on the user's machine when the user initially defines a profile by connecting to the Timely Information Server Profile Definition Website and is modified every time the user updates the profile through the Timely Information Server Profile Definition Website. Profiles may defined one of two ways. Simple keyword profiles use a set of keywords and OR logic is used in all cases. Therefor if any of the keywords in the profile occur in the alert then the alert is a hit. Advanced keyword profiles are defined in terms of a Boolean expression using AND, OR, NOT, and all other standard Boolean operators.

The Transport Engine 82 is comprised of the Multicast Channel Receiver 86 and the Control Channel Client 84. The Multicast Channel Receiver 86 is responsible for managing the multicast UDP sockets and monitoring the multicast groups. It detects whether the client is multicast enabled and updates connection status. The Multicast Receiver 86 also opens and closes the UDP sockets and passes individual alert strings to the Parsing Engine 88. It monitors the multicast groups in order to detect missing packets, apply error correction and decrypt encrypted channels. The Control Channel Client 84 manages the unicast TCP/IP socket, requests packet resends in case of missing packets, flags unrecoverable errors to the User Interface 90, and sends the click-through notification to the Timely Information Server 68.

Communication between the Server and the Enduser Client 66 consists of a number of UDP based multicast groups, called Alert Channels, which are responsible for streaming alerts to all the clients, and a unicast TCP/IP session between the individual client 66 and the Server 68 named Control Channel which is used for tracking and error-correction purposes. The former uses a proprietary data structure for the alerts while the latter relies on a proprietary application-level protocol.

The Alert Channel is an IP multicast group used to stream a succession of alerts from the Timely Information Server 68 to all clients 66 subscribed to that multicast group. Each client can listen to an unlimited number of channels simultaneously. Each alert is sent only once and transport protocols are standard IP/UDP and IGMP. An Alert is a variable-length UNICODE record composed of three parts: a Source-ID-part, a key-part and an argument-part. These parts are delimited by a NL (new-line) character. The source-ID-part is an alphanumeric code, that uniquely identifies a Timely Information Provider (assigned by the Timely Information Server). The key-part and argument-part each may have one or more sub-parts which are delimited by a TAB character. In the preferred embodiment the key-part of an alert has one or more sub-parts, one for each key of variable length; the argument-part of an alert has three sub-parts: a Headline, a URL, and a time stamp. Headlines are up to 128 characters and contain the title of the alert. The URL may be up to 128 characters long and recurring sequences (e.g. http://www) are abbreviated). Since UDP is an unreliable transport protocol, and since alerts are sent only once (i.e. the client does not have the opportunity to wait for the next alert re-send in case of data loss), the system includes provisions to deal with the inevitable UDP packet loss, including UDP resend and Forward Error Correction.

With UDP resend, the client will check for missing packets and request individual re-sends from the server using the Control Channel. Packets will be re-sent to individual clients using the Control Channel. The server will also attach an FEC packet to each alert. The client will check for integrity and reconstruct lost packets where possible. Since this increases the bandwidth used, it is a user-defined option.

The Control Channel is a TCP/IP session, constantly active during the Enduser client session that allows a private, dedicated conversation between the client and the Timely Information Server 68. This channel will be used primarily for tracking and error-correction purposes, and therefor will not be critical (i.e. its failure will not determine the end of the enduser session and it will require only minimal bandwidth).

Upon detecting a sequence of missing packets within an alert, the Enduser Client Transport Engine 82 will send a request to the server specifying the IDs of the missing packets and will await fulfillment within a timeout period of time. The request will be repeated a predetermined number of times and, failing to receive the packets, the Enduser Client Transport Engine 82 will discard the alert and instruct the User Interface 90 to display an error message.

Figure 11:
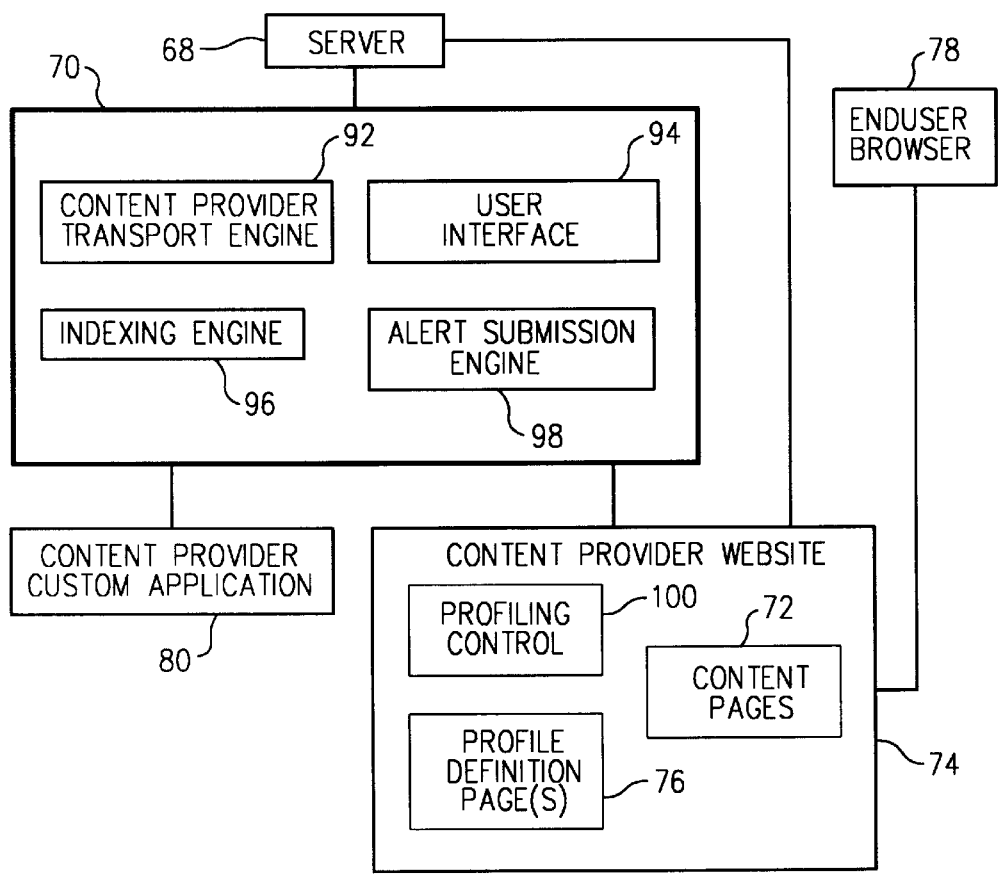
FIG. 11 is a functional diagram of the Timely Information Timely Information Provider Client software of the present invention.

Referring to FIG. 11, the Timely Information Provider Client 70 is comprised of Timely Information Provider Transport Engine 92, a User Interface Engine 94, an Indexing Engine 96, and an Alert Submission Engine 98. The Timely Information Provider Client 70 connects to the Timely Information Server 68 via the Timely Information Provider Transport Engine 92. The Timely Information Provider Client 70 also connects to the Timely Information Provider's Website 74 and any Timely Information Provider Custom Applications 80. The Timely Information Provider's Website 74 consists of Profiling Controls 100, a Profiling Definition Page 76, and Content Pages 72. The website 74 is in turn connected to the Timely Information Server 68 and the enduser's browser 78.

Alerts are submitted to the Timely Information Server 68 by means of a TCP/IP unicast connection using a dedicated Timely Information Server application level protocol or HTTP. The protocol, among other things, allows the Timely Information Provider Client 70 to know the status of the outgoing queue, etc. Access to the Timely Information Server Keyword Dictionary is performed by means of a TCP/IP unicast connection using a dedicated application level protocol or HTTP. The protocol includes provisions for validating keywords, getting the relevant Keyword Code (KC) for an existing keyword and updating the Timely Information Provider's keywords in the dictionary.

The Transport 92, Indexing 96 and Alert Submission 98 engines are available as DLLs or ActiveX controls. The Profiling Control 100 is an ActiveX control and/or plugin that Timely Information Providers can easily incorporate in their website 74, while the User Interface 94 is an executable program.

The User Interface 94 is a simple form that allows the Timely Information Provider to submit alerts manually and submit/modify/delete keywords. It also provides access to user options and statistical information about the connection.

The Timely Information Provider Transport Engine 92 manages the transport-level protocol (sockets). It accepts high-level commands from the indexing and alert submission engines and converts them to the Timely Information Server 68 application level protocol or HTTP.

The Indexing Engine 96 provides indexing functions for the Timely Information Provider Client 70. It allows submission of keywords in free text format and returns the Timely Information Server Code or a keyword not-found code. The Indexing Engine 96 provides thesaurus functions which allows the request of all or a subset of terms related to specific keywords. The Indexing Engine 96 also provides user profile functions that allow the Timely Information Provider to submit a user keyword profile to the server 68 and request a user keyword profile based on a user ID. The Indexing Engine 96 also allows Timely Information Providers to submit new keywords and delete old keywords.

The Alert Submission Engine 98 manages alert submission and the status queue. In operation, the engine accepts an alert, validates mandatory fields, passes the alert to the Timely Information Provider Transport Engine 92, and returns an acknowledgment that the alert has been submitted to the queue. The Alert Submission Engine 98 can also retrieve the status of the queue including number of messages in the queue and other statistics.

Figure 12:
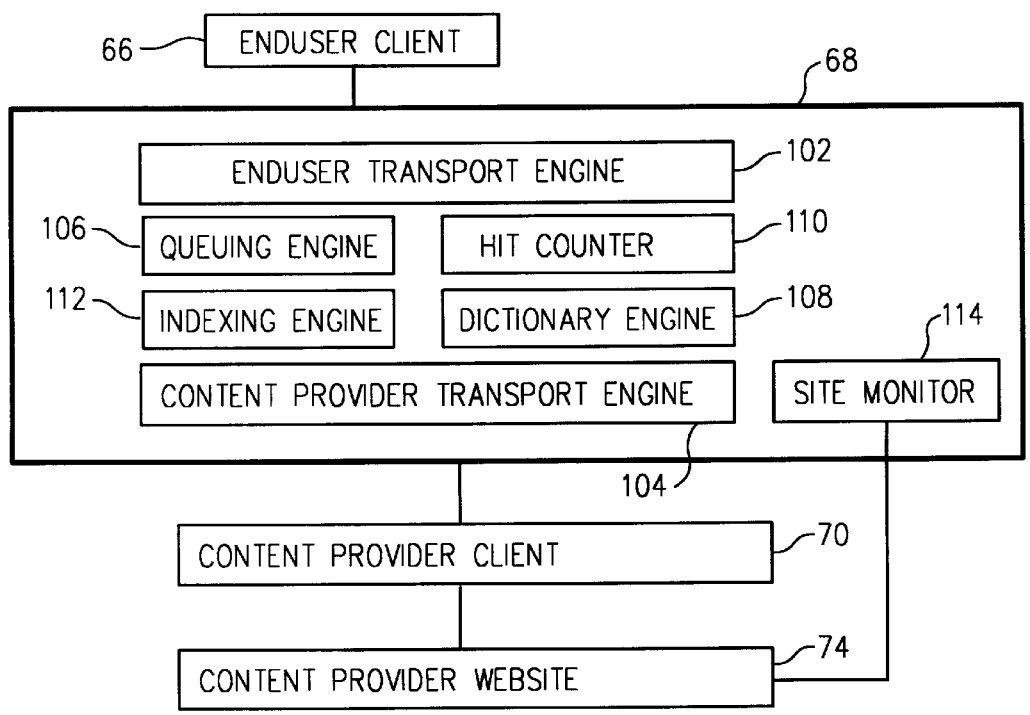
FIG. 12 is a functional diagram of the Timely Information Server software of the present invention.

Referring to FIG. 12, the Timely Information Server 68 application is comprised of an Enduser Transport Engine 102, a Timely Information Provider Transport Engine 104, a Queuing Engine 106, a Dictionary Engine 108, a Hit Counter 110, an Indexing Engine 112 and a Site Monitor 114. The Timely Information Server 68 communicates with the Enduser Client 66 via the Enduser Transport Engine 102 and communicates with the Timely Information Provider Client70 via the Timely Information Provider Transport Engine 104. The Site Monitor 114 application communicates directly with the Timely Information Provider Website 74.

The Enduser Transport Engine 102 is further comprised of an Alert Channel Streamer and a Control Channel Server. The Alert Channel Streamer manages UDP multicast sockets and the transport level protocol (sockets). The Alert Channel Streamer also receives alerts from the Queuing Engine 106, formats the alerts, and passes them to the appropriate UDP socket. The Streamer also encrypts private channels and applies error correction where required. The Control Channel Server is responsible for receiving click-through notifications and passing them to the Hit Counter 110 and resending individual packets as a result of resend requests.

The Queuing Engine 106 handles incoming alerts during peaks based on priority criteria specified in the Keyword Dictionary. The Queuing Engine 106 also stores sent alerts in time-limited buffer for the fulfillment of resend requests and compiling statistics on queue usage.

The Dictionary Engine 108 maintains references between keywords and providers as well as maintaining a thesaurus of related terms. The Dictionary Engine 108 stores and updates user profiles in the User Profile Database. The Dictionary Engine 108 also assigns proprietary index codes to keywords and returns keyword codes or error messages in response to requests from the Timely Information Provider Client 70.

The Site Monitor 114 application uses HTTP to monitor URLs for updates and composes, tags, and indexes the alerts by detecting page updates and communicating with the Dictionary Engine 108.

From the foregoing teachings, it can be appreciated by one skilled in the art that a new, novel, and nonobvious method for delivering information via a data network has been disclosed. It is to be understood that numerous alternatives and equivalents will be apparent to those of ordinary skill in the art, given the teachings herein, such that the present invention is not to be limited by the foregoing description but only by the appended claims.

We claim:

1. A method for allowing a server computer, via a computer network, to cause a client computer to connect to an information site on the network based on a match of keywords, comprising:

(a) creating a list containing a plurality of keywords, (b) storing in a memory on said client computer one or more selected keywords from said list, (c) storing on one or more information server computers connected to the network a plurality of sites of information, each at an address on the network, (d) associating with each address a set of keywords, each set comprising one or more keywords from said list, (e) for each address of the plurality of addresses, transmitting across the computer network from a keyword server computer to said client computer the address and the associated set of one or more keywords, and (f) at said client computer, comparing the transmitted keywords with said selected keywords and, if there is a match, causing said client computer to request a transmission of information from the site at the address associated with the matched keyword.

2. The method of claim 1 wherein, before the transmission of information is requested, a user is presented with a choice of whether the information should be requested and, if the user's response is affirmative, the information is requested.

3. The method of claim 1 wherein the step of comparing the transmitted keywords with said selected keywords is a Boolean operation.

4. The method of claim 1 wherein said sites of information are hypertext documents and said associated address is a Uniform Resource Locator.

5. The method of claim 2 adapted for collecting information on matches of keywords at the client computer further comprising:

(a) collecting in a memory on the client computer, for an affirmative user's response, a record consisting of one of: the address associated with the keyword which is matched, or the keyword which is matched, or the action taken by the client computer as a result of the match and the user's affirmative response, and (b) transmitting said record across the computer network to a record collecting computer.

6. The method of claim 1 wherein, to create the association between an address and a set of keywords, the keyword server computer:

(a) queries, across the network, an information server computer having a site, (b) receives from said queried information server computer a copy of information contained at the site, (c) reads each word in said information from said site and compares each word to said list of keywords, and (d) selects from said list of keywords those words which it finds in said information.

7. The method of claim 1 wherein said client computer is associated with a television tuner and a display for displaying information received from a site.

8. The method of claim 1 wherein the selected keywords are selected at a keyword selection computer and transmitted to the client computer across a network.

9. The method of claim 8 wherein the selection computer selects the selected keywords based on an interest profile provided by a user at the client computer and transmitted to the selection computer across a network.

10. A method for allowing a server computer, via a multicast network, to cause a plurality of client computers each to take an action relative to an argument based on a match of keywords, comprising:

(a) creating a list containing a plurality of keywords, (b) on each of a plurality of client computers, storing in a memory one or more selected keywords from said list, (c) defining a plurality of arguments, (d) associating with each argument a set of keywords, each set comprising one or more keywords from said list, (e) for each argument of the plurality of arguments, multicasting across a computer network from a keyword server computer simultaneously to each of said plurality of client computers via multicast addressed packets the argument and the associated set of one or more keywords, and (f) at each of said client computers, comparing the transmitted keywords with said selected keywords and, if there is a match, causing the client computer to take an action relative to the argument associated with the matched keyword.

11. The method of claim 10 wherein the selected keywords are selected at a keyword selection computer and transmitted to the client computer across a network.

12. The method of claim 11 wherein the selection computer selects the selected keywords based on an interest profile provided by a user at the client computer and transmitted to the selection computer across a network.

13. The method of claim 10 adapted for distributing information from a server computer to a plurality of client computers via a network, further comprising:

(a) assembling a plurality of items of information, (b) associating with each item one of the sets of one or more keywords and causing said item to be represented in the argument associated with said set of one or more keywords, and (c) the action taken by the client computer is to present to a user the item associated with the matched keyword.

14. The method of claim 13 wherein, before said item is presented, the user is presented with an option to have said item presented and said item is not presented if the user does not indicate a preference to have said item presented.

15. The method of claim 13 wherein said item is presented visually on a display.

16. The method of claim 13 wherein said item is presented aurally through a speaker.

17. The method of claim 10 wherein one of the sets of one or more keywords represents an item for sale in a market and the associated argument represents a reference to triggering information about said item, the action is taken if the triggering information meets a predefined threshold, and the action taken is to place in the market an order to buy or to sell said item.

18. The method of claim 17 wherein each keyword set represents a commodity and the associated argument includes one of the current price and the current volume traded for said commodity.

19. The method of claim 10 wherein one of the sets of one or more keywords represents an available property, the associated argument represents a reference to triggering information about the property, and the action is taken if the triggering information meets a predefined threshold.

20. The method of claim 19 wherein the action taken is to retrieve more information about the property.

21. The method of claim 19 wherein the action taken is to place an option to acquire the property.

22. The method of claim 10 wherein the argument associated with a matched set of keywords represents a reference to an event, the action is taken if the event fits a predefined filter for such events, and the action taken is to adjust a control for an appliance which is connected to the client computer.

23. The method of claim 22 wherein said appliance is a communications receiver.

24. The method of claim 23 wherein said communications receiver is a television.

25. The method of claim 22 wherein said appliance is an environmental control device.

26. The method of claim 10 wherein, before the action is taken, a user is presented with a choice of whether the action should be taken and, if the user's response is affirmative, the action is taken.

27. The method of claim 10 wherein the step of comparing the transmitted keywords with said selected keywords is a Boolean operation.

28. The method of claim 26 adapted for collecting information on matches of keywords at the client computer further comprising:

(a) collecting in a memory on the client computer, for an affirmative user's response, a record consisting of one of: the argument associated with the keyword which is matched, or the keyword which is matched, or the action taken by the client computer as a result of the match and the user's affirmative response, and (b) transmitting said record across the computer network to a record collecting computer.

29. A method for allowing a server computer, via a network, to cause a client computer to take an action relative to an argument based on a match of keywords, comprising:

(a) creating a list containing a plurality of keywords, (b) storing in a memory on said client computer one or more selected keywords from said list, (c) defining a plurality of arguments, (d) associating with each argument a set of keywords, each set comprising two or more keywords from said list, (e) for each argument of the plurality of arguments, transmitting across a computer network from a keyword server computer to said client computer the argument and the associated set of two or more keywords, and (f) at said client computer, comparing the transmitted keywords with said selected keywords and, if there is a match, causing said client computer to take an action relative to the argument associated with the matched keyword.

30. The method of claim 29 adapted for distributing information from a server computer to a client computer via a network, further comprising:

(a) assembling a plurality of items of information, (b) associating with each item one of the sets of two or more keywords and causing said item to be represented in the argument associated with said set of two or more keywords, wherein the action taken by the client computer is to present to a user said item.

31. The method of claim 30 wherein, before said item is presented, the user is presented with an option to have said item presented and said item is not presented if the user does not indicate a preference to have said item presented.

32. The method of claim 30 wherein said item is presented visually on a display.

33. The method of claim 30 wherein said item is presented aurally via a speaker.

34. A method for allowing a server computer, via a network, to cause a client computer to adjust a channel selector to receive information broadcast on a channel, comprising:

(a) creating a list containing a plurality of keywords, (b) storing in a memory on said client computer one or more selected keywords from said list, (c) defining a plurality of channel references, one for each channel of a plurality of channels on which information is simultaneously broadcast to a plurality of receivers, (d) associating with each channel reference a set of keywords, each set comprising one or more keywords from said list, (e) for each channel reference of the plurality of channel references, transmitting across a computer network from a keyword server computer to said client computer the channel reference and the associated set of one or more keywords, and (f) at said client computer, comparing the transmitted keywords with said selected keywords and, if there is a match, causing said client computer to adjust a channel selector on one of the plurality of receivers to receive the channel associated with the matched keyword.

35. A method for allowing a server computer, via a network, to cause a client computer to take an action relative to an argument based on a match of keywords and collecting data via the network about the actions taken, comprising:

(a) creating a list containing a plurality of keywords, (b) storing in a memory on said client computer a set of one or more selected keywords from said list and storing on a data collecting computer the same set of one or more selected keywords, (c) defining a plurality of arguments, (d) associating with each argument a set of keywords, each set comprising one or more keywords from said list, (e) for each argument of the plurality of arguments, transmitting across a computer network from a keyword server computer to said client computer and to said data collecting computer the argument and the associated set of one or more keywords, (f) at said client computer, when the client computer logs on for receiving said transmitted arguments and keywords, sending a log on notice to said data collecting computer, (g) at said client computer, comparing the transmitted keywords with said selected keywords and, if there is a match, causing said client computer to take an action relative to the argument associated with the matched keyword, (h) at said client computer, when the client computer logs off from receiving said transmitted arguments and keywords, sending a log off notice to said data collecting computer, and (i) at said data collecting computer, inferring a list of keyword matches made by said client computer from the received data consisting of selected keywords on the client, when the client logged on and logged off, and which keywords were transmitted during log on at the client.

36. A system for allowing a server computer, via a computer network, to cause a client computer to connect to an information site on the network based on a match of keywords, comprising:

(a) means for creating a list containing a plurality of keywords, (b) means for storing in a memory on said client computer one or more selected keywords from said list, (c) means for storing on one or more information server computers connected to the network a plurality of sites of information, each at an address on the network, (d) means for associating with each address a set of keywords, each set comprising one or more keywords from said list, (e) for each address of the plurality of addresses, means for transmitting across the computer network from a keyword server computer to said client computer the address and the associated set of one or more keywords, and (f) means for, at said client computer, comparing the transmitted keywords with said selected keywords and, if there is a match, causing said client computer to request a transmission of information from the site at the address associated with the matched keyword.

37. The system of claim 36 further including, before the transmission of information is requested, means for presenting to a user a choice of whether the information should be requested and, if the user's response is affirmative, requesting the information.

38. The system of claim 36 wherein the means for comparing the transmitted keywords with said selected keywords performs a Boolean operation.

39. The system of claim 36 wherein said sites of information are hypertext documents and said associated address is a Uniform Resource Locator.

40. The system of claim 37 adapted for collecting information on matches of keywords at the client computer further comprising:

(a) means for collecting in a memory on the client computer, for an affirmative user's response, a record consisting of one of: the address associated with the keyword which is matched, or the keyword which is matched, or the action taken by the client computer as a result of the match and the user's affirmative response, and (b) means for transmitting said record across the computer network to a record collecting computer.

41. The system of claim 36 wherein, to create the association between an address and a set of keywords, the keyword server computer further includes:

(a) means for quering, across the network, an information server computer having a site, (b) means for receiving from said queried information server computer a copy of information contained at the site, (c) means for reading each word in said information from said site and comparing each word to said list of keywords, and (d) means for selecting from said list of keywords those words which it finds in said information.

42. The system of claim 36 wherein said client computer is associated with a television tuner and a display for displaying information received from a site.

43. The system of claim 36 wherein the selected keywords are selected at a keyword selection computer and transmitted to the client computer across a network.

44. The system of claim 43 wherein the selection computer selects the selected keywords based on an interest profile provided by a user at the client computer and transmitted to the selection computer across a network.

45. A system for allowing a server computer, via a multicast network, to cause a plurality of client computers each to take an action relative to an argument based on a match of keywords, comprising:

(a) means for creating a list containing a plurality of keywords, (b) means for, on each of a plurality of client computers, storing in a memory one or more selected keywords from said list, (c) means for defining a plurality of arguments, (d) means for associating with each argument a set of keywords, each set comprising one or more keywords from said list, (e) for each argument of the plurality of arguments, meaans for multicasting across a computer network from a keyword server computer simultaneously to each of said plurality of client computers via multicast addressed packets the argument and the associated set of one or more keywords, and (f) means for, at each of said client computers, comparing the transmitted keywords with said selected keywords and, if there is a match, causing the client computer to take an action relative to the argument associated with the matched keyword.

46. The system of claim 45 wherein the selected keywords are selected at a keyword selection computer and transmitted to the client computer across a network.

47. The system of claim 46 wherein the selection computer selects the selected keywords based on an interest profile provided by a user at the client computer and transmitted to the selection computer across a network.

48. The system of claim 45 adapted for distributing information from a server computer to a plurality of client computers via a network, further comprising:

(a) means for assembling a plurality of items of information, and (b) means for associating with each item one of the sets of one or more keywords and causing said item to be represented in the argument associated with said set of one or more keywords, (c) wherein the action taken by the client computer is to present to a user the item associated with the matched keyword.

49. The system of claim 48 wherein, before said item is presented, the user is presented with an option to have said item presented and said item is not presented if the user does not indicate a preference to have said item presented.

50. The system of claim 48 wherein said item is presented visually on a display.

51. The system of claim 48 wherein said item is presented aurally through a speaker.

52. The system of claim 45 wherein one of the sets of one or more keywords represents an item for sale in a market and the associated argument represents a reference to triggering information about said item, the action is taken if the triggering information meets a predefined threshold, and the action taken is to place in the market an order to buy or to sell said item.

53. The system of claim 52 wherein each keyword set represents a commodity and the associated argument includes one of the current price and the current volume traded for said commodity.

54. The system of claim 45 wherein one of the sets of one or more keywords represents an available property, the associated argument represents a reference to triggering information about the property, and the action is taken if the triggering information meets a predefined threshold.

55. The system of claim 54 wherein the action taken is to retrieve more information about the property.

56. The system of claim 54 wherein the action taken is to place an option to acquire the property.

57. The system of claim 45 wherein the argument associated with a matched set of keywords represents a reference to an event, the action is taken if the event fits a predefined filter for such events, and the action taken is to adjust a control for an appliance which is connected to the client computer.

58. The system of claim 57 wherein said appliance is a communications receiver.

59. The system of claim 58 wherein said communications receiver is a television.

60. The system of claim 57 wherein said appliance is an environmental control device.

61. The system of claim 45 wherein, before the action is taken, a user is presented with a choice of whether the action should be taken and, if the user's response is affirmative, the action is taken.

62. The system of claim 45 further including means for comparing the transmitted keywords with said selected keywords in a Boolean operation.

63. The system of claim 61 adapted for collecting information on matches of keywords at the client computer further comprising:

(a) means for collecting in a memory on the client computer, for an affirmative user's response, a record consisting of one of: the argument associated with the keyword which is matched, or the keyword which is matched, or the action taken by the client computer as a result of the match and the user's affirmative response, and (b) means for transmitting said record across the computer network to a record collecting computer.

64. A system for allowing a server computer, via a network, to cause a client computer to take an action relative to an argument based on a match of keywords, comprising:

(a) means for creating a list containing a plurality of keywords, (b) means for storing in a memory on said client computer one or more selected keywords from said list, (c) means for defining a plurality of arguments, (d) means for associating with each argument a set of keywords, each set comprising two or more keywords from said list, (e) means for, for each argument of the plurality of arguments, transmitting across a computer network from a keyword server computer to said client computer the argument and the associated set of two or more keywords, and (f) means for, at said client computer, comparing the transmitted keywords with said selected keywords and, if there is a match, causing said client computer to take an action relative to the argument associated with the matched keyword.

65. The system of claim 64 adapted for distributing information from a server computer to a client computer via a network, further comprising:

(a) means for assembling a plurality of items of information, and (b) means for associating with each item one of the sets of two or more keywords and causing said item to be represented in the argument associated with said set of two or more keywords, (c) wherein the action taken by the client computer is to present to a user said item.

66. The system of claim 65 wherein, before said item is presented, the user is presented with an option to have said item presented and said item is not presented if the user does not indicate a preference to have said item presented.

67. The system of claim 65 wherein said item is presented visually on a display.

68. The system of claim 65 wherein said item is presented aurally via a speaker.

69. A system for allowing a server computer, via a network, to cause a client computer to adjust a channel selector to receive information broadcast on a channel, comprising:

(a) means for creating a list containing a plurality of keywords, (b) means for storing in a memory on said client computer one or more selected keywords from said list, (c) means for defining a plurality of channel references, one for each channel of a plurality of channels on which information is simultaneously broadcast to a plurality of receivers, (d) means for associating with each channel reference a set of keywords, each set comprising one or more keywords from said list, (e) means for, for each channel reference of the plurality of channel references, transmitting across a computer network from a keyword server computer to said client computer the channel reference and the associated set of one or more keywords, and (f) means for, at said client computer, comparing the transmitted keywords with said selected keywords and, if there is a match, causing said client computer to adjust a channel selector on one of the plurality of receivers to receive the channel associated with the matched keyword.

70. A system for allowing a server computer, via a network, to cause a client computer to take an action relative to an argument based on a match of keywords and collecting data via the network about the actions taken, comprising:

(a) means for creating a list containing a plurality of keywords, (b) means for storing in a memory on said client computer a set of one or more selected keywords from said list and storing on a data collecting computer the same set of one or more selected keywords, (c) means for defining a plurality of arguments, (d) means for associating with each argument a set of keywords, each set comprising one or more keywords from said list, (e) means for, for each argument of the plurality of arguments, transmitting across a computer network from a keyword server computer to said client computer and to said data collecting computer the argument and the associated set of one or more keywords, (f) means for, at said client computer, when the client computer logs on for receiving said transmitted arguments and keywords, sending a log on notice to said data collecting computer, (g) means for, at said client computer, comparing the transmitted keywords with said selected keywords and, if there is a match, causing said client computer to take an action relative to the argument associated with the matched keyword, (h) means for, at said client computer, when the client computer logs off from receiving said transmitted arguments and keywords, sending a log off notice to said data collecting computer, and (i) means for, at said data collecting computer, inferring a list of keyword matches made by said client computer from the received data consisting of selected keywords on the client, when the client logged on and logged off, and which keywords were transmitted during log on at the client.

* * * * *